(12) United States Patent
 Ebersberger

(10) Patent No.: US 9,185,535 B2
(45) Date of Patent: Nov. 10, 2015

(54) METHOD AND DEVICE FOR SYNCHRONIZATION OF SPEECH AND DATA CONCERNING LOCATION INFORMATION FOR LOCATION-RELATED SERVICES

(75) Inventor: Georg Ebersberger, Duesseldorf (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1805 days.

(21) Appl. No.: 11/918,519

(22) PCT Filed: Mar. 16, 2006

(86) PCT No.: PCT/EP2006/060813
 § 371 (c)(1),
 (2), (4) Date: Dec. 22, 2008

(87) PCT Pub. No.: WO2006/108752
 PCT Pub. Date: Oct. 19, 2006

(65) Prior Publication Data
 US 2009/0215425 A1    Aug. 27, 2009

(30) Foreign Application Priority Data

Apr. 14, 2005   (DE) .......................... 10 2005 017 393

(51) Int. Cl.
 *H04W 4/22*       (2009.01)
 *G08B 21/02*      (2006.01)
 *G08B 25/08*      (2006.01)
 *G08B 29/16*      (2006.01)
 (Continued)

(52) U.S. Cl.
 CPC ............. *H04W 4/22* (2013.01); *G08B 21/0269* (2013.01); *G08B 25/08* (2013.01); *G08B 29/16* (2013.01); *H04M 11/04* (2013.01); *H04M 11/045* (2013.01); *H04W 76/007* (2013.01); *H04W 4/02* (2013.01)

(58) Field of Classification Search
 CPC ........................... H04W 4/22; G01S 2205/006
 USPC .............. 370/493–495; 455/40, 404.1, 404.2, 455/464, 456.1, 502, 426; 342/357.37
 See application file for complete search history.

(56) References Cited

U.S. PATENT DOCUMENTS 5,630,209 A    5/1997   Wizgall
5,826,195 A   10/1998   Westerlage
(Continued)

FOREIGN PATENT DOCUMENTS

CN    1604608 A    4/2005
EP    0632635      11/2001
(Continued)

OTHER PUBLICATIONS

International Search Report in International Patent Application No. PCT/EP2006/060813, mailed on Aug. 2, 2006.

*Primary Examiner* — Robin Mishler
*Assistant Examiner* — Kuo Woo
(74) *Attorney, Agent, or Firm* — Leydig, Voit & Mayer, Ltd.

(57) ABSTRACT

A method, system, and device are provided for transmitting emergency calls by means of a mobile device via a speech channel and a data channel. The data channel serves to transmit location information. The location information may be transmitted in encoded form. The information also may be transmitted via the speech channel. The information may then be compared for consistency in the service center.

20 Claims, 2 Drawing Sheets

(51) Int. Cl.
*H04M 11/04* (2006.01)
*H04W 76/00* (2009.01)
*H04W 4/02* (2009.01)

(56) References Cited

U.S. PATENT DOCUMENTS 6,144,336 A * 11/2000 Preston et al. ............ 342/357.37
7,496,978 B1 * 3/2009 Begeja et al. ............... 455/404.1
2003/0063714 A1 4/2003 Stumer

FOREIGN PATENT DOCUMENTS

| | | |
|---|---|---|
| GB | 2311442 | 9/1997 |
| JP | 2005-079693 | 3/2005 |
| WO | WO 02/11417 | 2/2002 |

* cited by examiner

METHOD AND DEVICE FOR SYNCHRONIZATION OF SPEECH AND DATA CONCERNING LOCATION INFORMATION FOR LOCATION-RELATED SERVICES

FIELD OF INVENTION

The present invention relates to a method and a plurality of devices for transmitting and receiving emergency calls by means of a mobile device via a speech channel and a data channel. The present invention further relates to a data channel serving to transmit location information.

BACKGROUND

An emergency call with exact location information (e.g., from GPS—Global Positioning System) from a mobile telephone network uses a data channel (e.g., SMS or GPRS) and a speech channel in order to transmit the entirety of the emergency call information (e.g., location, cause of the accident, identity of the caller) to an emergency call center. The data supplied via the data channel must be synchronized with the speech channel in order that all the emergency information can be passed on together to the rescue center. The synchronization of incoming speech calls and the data (e.g., via SMS) takes place nowadays within the context of location-related services via the call number of the customer (MSISDN—Mobile Subscriber Integrated Services Digital Network Number) with support from ACD (Automatic Call Distribution) systems and CTI (Computer Telephony Integration) functions. The MSISDN (call number) is contained within the signaling data or the data themselves. For the speech connection, the MSISDN is usually transmitted to the telecommunication system at the service center (e.g., call center), when the customer has switched on the CLIP (Calling Line Identification Presentation) or has accessed the speech connection of the service center via the CLIR Overwrite (Calling Line Identification Restriction) feature (the suppressed CLI is nevertheless displayed). The synchronization then takes place in such a manner that this MSISDN is made known to the system for speech processing (e.g., the client workstation of a call center agent). The data belonging to this speech call with this MSISDN is meanwhile present in a database with the identification feature MSISDN from the data transmission and can therefore be assigned to the speech channel.

SUMMARY OF THE INVENTION

Embodiments of the present invention provide a method and a device which ensure synchronization of data and speech for location-related services.

In an embodiment, in order to be able to synchronize data and speech reliably for location-related services if the MSISDN of the speech call cannot be determined, as an alternative, the position data are used. Within the framework of the location-related service, after establishment of the connection, that is once the speech connection exists, the position (geographical latitude and longitude) of the mobile terminal device is transmitted, for example, in the form of DTMF (Dual Tone Multiple Frequency) tones, to the service center (for example, the call center). In another embodiment, the transmission may be constructed as a different modulation of the phase or the amplitude. Thus, at least one piece of positional information is transmitted in redundant manner and the emergency can be processed, even if the data channel is defective. In a further embodiment, the exact same position information is a component of the data that have been sent to the service center. In a further embodiment, in the service center, the DTMF—Dual Tone Multi Frequency—tones are decoded and converted into the position. For example, one application now seeks the data set matching these position data, for example, from a database. The position is the identifying features here. A distinction is made between the current service use and old service uses that may be present in a database, for example, via suitable time signatures (receipt of the data or of the speech call). In order to enable unambiguous identification, either both position data sets are to be given to the same degree of accuracy or they must lie at a defined small distance from one another. It appears to be relatively less useful to transmit the MSISDN in addition to the position information, since then too much time elapses at the beginning of the speech call before the operator can accept the call.

In an embodiment of the present invention, the geographical position can be determined either via the mobile terminal device, for example, a mobile telephone, telematic terminal devices or the base station (by bearing taking), where either the mobile terminal device or the base station (or both) transmit the position coordinates via the speech channel.

In a further embodiment of the present invention, this solution can be used both for call center-supported services and for automated services without call center agents.

The disadvantages of the prior art may be overcome. Past efforts involved the disadvantage that the transmission of the CLI of the client telephone cannot always be guaranteed, since it is able to display this at the device. CLIR overwrite as a possible fall-back position is not preserved for all services from data protection standpoints and is also not technically assured for international roaming. This can lead to that the provision of the service in the desired quality is not possible.

DETAILED DESCRIPTION

Figure 1:
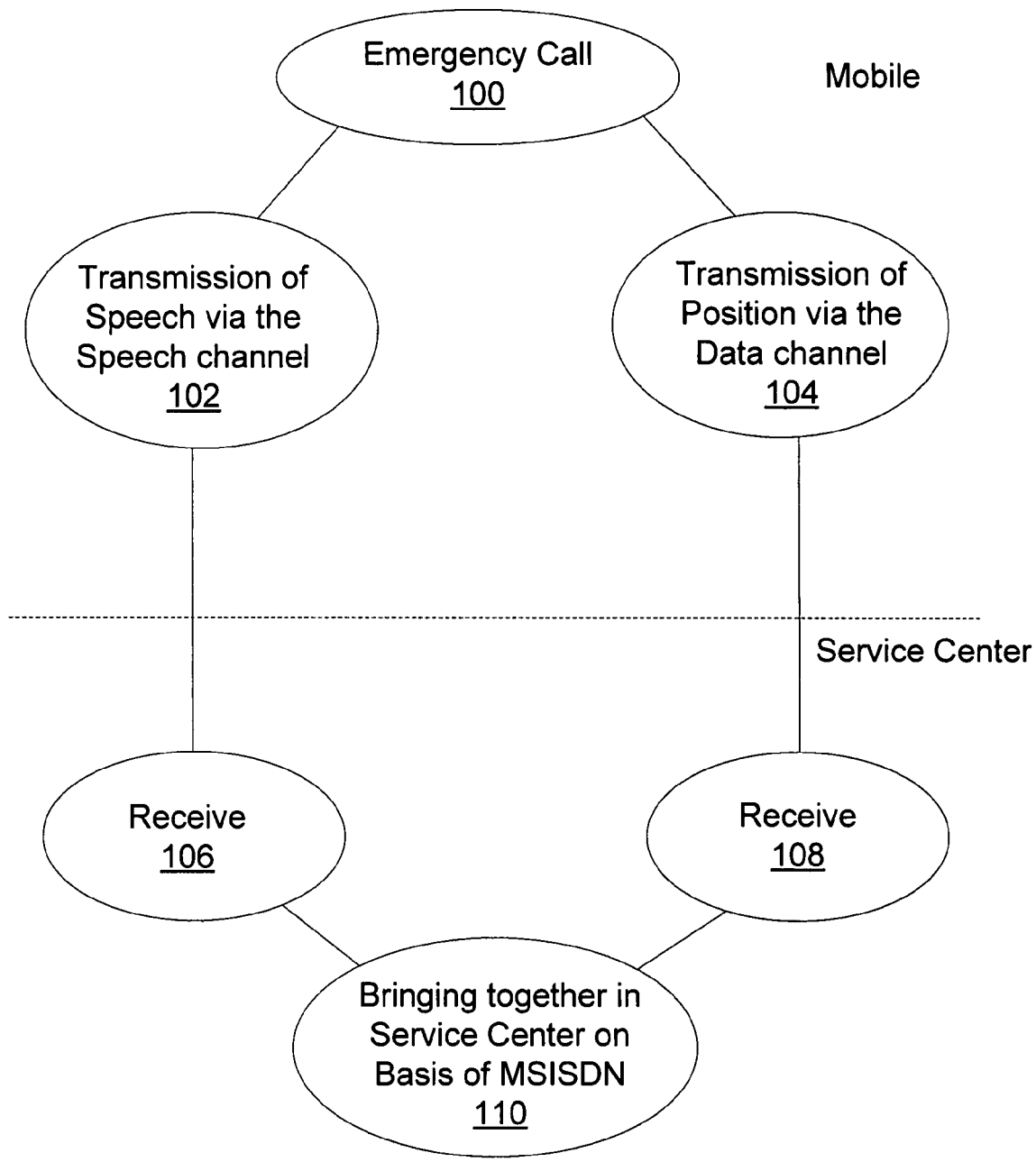
FIG. 1 shows a sequence according to the prior art.

FIG. 1 shows an available method wherein the emergency call 100 is issued in a communication of the position via the data channel 104 and communication of the speech information via the speech channel 102. After receipt by the service center 106, 108, the information is brought together 110 based on the call identification or the telephone number. This method relies on the prerequisite, however, that no information is lost.

Figure 2:
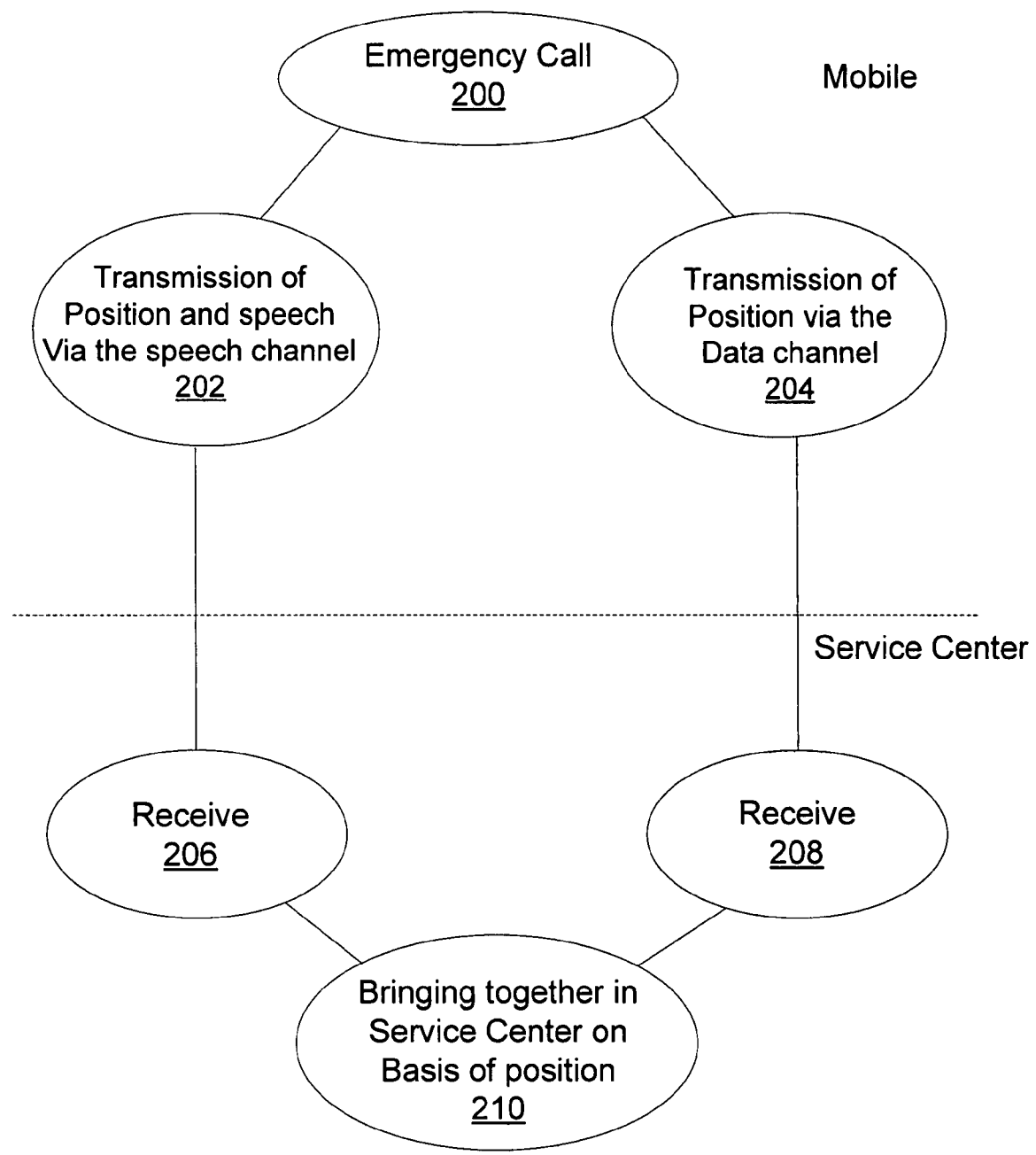
FIG. 2 shows a sequence plan of the method according to the invention.

FIG. 2 shows a development according to an embodiment of the present invention wherein the emergency call 200 is issued and the position is transmitted both via the data channel 204 and via the speech channel 202. After receipt by the service center 206, 208, in the service center, the information is brought together 210 based on the position or the coordinates. It is therefore ensured that the information is redundant and additionally that transmission errors or inaccuracies can be trapped.

An embodiment of the present invention provides for a method for transmitting emergency calls by means of a mobile device via a speech channel and a data channel, wherein the data channel serves to transmit location information, wherein the location information is also transmitted in encoded form via the speech channel and wherein the location information that has been transmitted via the speech channel is compared at the receiver with the location information that has been transmitted via the data channel. In further embodiments, the location information is transmitted in the form of DTMF tones. In further embodiments, the location information is transmitted at the start of the connection. In further embodiments, the location information is determined by the base station where the mobile terminal device is registered, in order then to transmit the information via the speech channel. In further embodiments, the location information is determined by a GPS receiver in active connection with the mobile terminal device.

In further embodiments of the present invention, the comparison is made on the basis of a comparison of the geographical coordinates. In further embodiments, the comparison is made only for location information which arrives within a predetermined interval. In further embodiments, the coordinates are allowed to possess a deviation only within a predetermined tolerance. The afore-described exemplary embodiments may be used in various combinations with and without each other.

An embodiment of the present invention provides for a device for transmitting emergency calls with means and an apparatus for transmitting information via a speech channel and a data channel, wherein the means use the data channel for transmitting location information, wherein, furthermore, the means are designed and arranged such that the location information is also transmitted in encoded form via the speech channel. In further embodiments, the means are present and arranged in order to transmit the location information in the form of DTMF tones. In further embodiments, the means are designed and arranged such that the location information is transmitted at the start of the connection. In further embodiments, the device is a base station at which a mobile terminal device is registered, in order then to transmit the information via the speech channel. In further embodiments, the device is a mobile terminal device which has means in order to detect the location information. In further embodiments, the location information is determined by a GPS receiver which is in active connection with the mobile terminal device. The afore-described exemplary embodiments may be used in various combinations with and without each other.

An embodiment of the present invention provides for a receiving device for receiving emergency calls, having means and an apparatus in order to receive information via a speech channel and a data channel, wherein the means use the data channel to receive location information, wherein the means are arranged and designed such that the location information can be received and evaluated both via the data channel and via the speech channel. In further embodiments, means are present which compare the location information that has been transmitted via the speech channel with the location information that has been transmitted via the data channel. In further embodiments, the comparison is made on the basis of the comparison of geographical coordinates. In further embodiments, the comparison is made only for location information that has arrived within a predetermined time interval. In further embodiments, the coordinates are allowed to possess a deviation only within a predetermined tolerance. The afore-described exemplary embodiments may be used in various combinations with and without each other.

An embodiment of the present invention provides for a data carrier for a computer, characterized by the storage of a data structure which implements one or more of the afore-described method embodiments on a computer.

An embodiment of the present invention provides for a computer system, characterized by an apparatus which permits the carrying out of one or more of the afore-described method embodiments.

Within the context of the present invention, numerous derivations and further developments of the exemplary embodiments described can be realized. The above-described embodiments do not represent any limitation. Rather, the scope of protection is set by the claims.

The invention claimed is:

1. A method for processing emergency calls from a mobile device, comprising:
   receiving, at a service center, an emergency call from the mobile device via a speech channel and a data channel, wherein the emergency call includes reception of location information via the data channel from the mobile device and reception of location information in encoded form via the speech channel from the mobile device;
   comparing, by a computing device at the service center, the location information received via the speech channel with the location information received via the data channel; and
   synchronizing, by the computing device at the service center, a speech portion of the emergency call with a data portion of the emergency call based on a result of the comparison of the location information received via the speech channel with the location information received via the data channel indicating a match;
   wherein the location information received via the speech channel and the location information received via the data channel correspond to a location of the mobile device.

2. The method according to claim 1, wherein the location information received via the speech channel is in the form of dual tone multi frequency (DTMF) tones.

3. The method according to claim 1, wherein the location information is received at the start of the emergency call.

4. The method according to claim 1, wherein the location information received via the speech channel is determined by a base station where the mobile terminal device is registered.

5. The method according to claim 1, wherein the location information received via the speech channel and the location information received via the data channel are determined by a satellite signal-based receiver in active connection with the mobile device.

6. The method according to claim 5, wherein comparing the location information received via the speech channel with the location information received via the data channel is based on a comparison of geographical coordinates.

7. The method according to claim 1, further comprising:
   determining that the location information received via the speech channel and the location information received via the data channel were received at the service center within a predetermined interval.

8. The method according to claim 1, further comprising:
   determining that the location information received via the speech channel and the location information received via the data channel do not deviate from each other outside of a predetermined tolerance.

9. A device for making emergency calls, comprising:
   a first interface for connecting to a speech channel;
   a second interface for connecting to a data channel;
   a processor, configured to cause one or more transmitters to transmit an emergency call via the speech channel and the data channel, wherein the emergency call includes transmission of location information via the data channel through the second interface and transmission of location information in encoded form via the speech channel through the first interface;

wherein the location information transmitted via the speech channel and the location information transmitted via the data channel correspond to a location of a mobile device and enable synchronization of a speech portion of the emergency call with a data portion of the emergency call by a computing device of a service center based on a result of a comparison of the location information transmitted via the speech channel with the location information transmitted via the data channel indicating a match.

10. The device according to claim 9, wherein the processor is configured to cause the location information transmitted via the speech channel to be transmitted in the form of dual tone multi frequency (DTMF) tones.

11. The device according to claim 9, wherein the processor is configured to cause the location information to be transmitted at the start of an emergency call.

12. The device according to claim 9, wherein the device is a base station at which the mobile device is registered.

13. The device according to claim 9, wherein the device is the mobile device and the mobile device further comprises:
a location determination device for determining the location of the mobile device.

14. The device according to claim 13, wherein the location determination device is a satellite signal-based receiver.

15. A device, corresponding to a service center, for receiving and processing emergency calls from a mobile device, comprising:
a first interface for connecting to a speech channel;
a second interface for connecting to a data channel;
a processor, configured to cause one or more receivers to receive location information transmitted via the speech channel by the mobile device through the first interface and to receive location information transmitted via the data channel by the mobile device through the second interface, the processor being further configured to evaluate the location information transmitted via the speech channel and the location information transmitted via the data channel;
wherein the location information transmitted via the speech channel and the location information transmitted via the data channel correspond to a location of the mobile device; and
wherein the location information transmitted via the speech channel and the location information transmitted via the data channel are part of an emergency call and the processor is further configured to synchronize a speech portion of the emergency call with a data portion of the emergency call based on the evaluation of the location information transmitted via the speech channel and the location information transmitted via the data channel indicating a match.

16. The device according to claim 15, wherein evaluation of the location information transmitted via the speech channel and the location information transmitted via the data channel comprises comparing the location information transmitted via the speech channel with the location information transmitted via the data channel.

17. The device according to claim 16, wherein the comparison is made on the basis of a comparison of geographical coordinates.

18. The device according to claim 16, wherein the processor is further configured to determine that the location information transmitted via the speech channel and the location information transmitted via the data channel was received at the device within a predetermined time interval.

19. The device according to claim 15, wherein the processor is further configured to determine that the location information transmitted via the speech channel and the location information transmitted via the data channel do not deviate from each other outside of a predetermined tolerance.

20. A non-transitory computer-readable medium, corresponding to a service center, having computer-executable instructions stored thereon for processing emergency calls from a mobile device, the computer-executable instructions, when executed by a processor, causing the following steps to be performed:
receiving an emergency call from the mobile device via a speech channel and a data channel, wherein the emergency call includes reception of location information via the data channel from the mobile device and reception of location information in encoded form via the speech channel from the mobile device;
comparing the location information received via the speech channel with the location information received via the data channel; and
synchronizing a speech portion of the emergency call with a data portion of the emergency call based on a result of the comparison of the location information received via the speech channel with the location information received via the data channel indicating a match;
wherein the location information received via the speech channel and the location information received via the data channel correspond to a location of the mobile device.

* * * * *